United States Patent
Laselva et al.

(10) Patent No.: US 12,317,227 B2
(45) Date of Patent: May 27, 2025

(54) PAGING IN WIRELESS SYSTEMS

(71) Applicant: Nokia Technologies Oy, Espoo (FI)

(72) Inventors: Daniela Laselva, Klarup (DK);
Jussi-Pekka Koskinen, Oulu (FI);
Mads Lauridsen, Gistrup (DK)

(73) Assignee: Nokia Technologies Oy, Espoo (FI)

( * ) Notice: Subject to any disclaimer, the term of this patent is extended or adjusted under 35 U.S.C. 154(b) by 375 days.

(21) Appl. No.: 17/792,071

(22) PCT Filed: Jan. 14, 2021

(86) PCT No.: PCT/FI2021/050020
§ 371 (c)(1),
(2) Date: Jul. 11, 2022

(87) PCT Pub. No.: WO2021/160928
PCT Pub. Date: Aug. 19, 2021

(65) Prior Publication Data
US 2023/0048308 A1 Feb. 16, 2023

Related U.S. Application Data

(60) Provisional application No. 62/976,629, filed on Feb. 14, 2020, provisional application No. 62/975,883, filed on Feb. 13, 2020.

(51) Int. Cl.
*H04W 68/02* (2009.01)
*H04W 76/27* (2018.01)
*H04W 76/28* (2018.01)

(52) U.S. Cl.
CPC .......... *H04W 68/02* (2013.01); *H04W 76/27* (2018.02); *H04W 76/28* (2018.02)

(58) Field of Classification Search
None
See application file for complete search history.

(56) References Cited

U.S. PATENT DOCUMENTS

| 10,314,005 | B2 * | 6/2019 | Kim .................... H04W 76/27 |
| 2018/0270792 | A1 * | 9/2018 | Park .................... H04W 68/025 |
| 2018/0270895 | A1 | 9/2018 | Park et al. |

(Continued)

FOREIGN PATENT DOCUMENTS

| CN | 109246819 A | 1/2019 |
| WO | 2020/192936 A1 | 10/2020 |

OTHER PUBLICATIONS

Extended European Search Report received for corresponding European Patent Application No. 21754039.2, dated Jan. 31, 2024, 7 pages.

(Continued)

*Primary Examiner* — Adolf Dsouza
(74) *Attorney, Agent, or Firm* — Barta Jones, PLLC

(57) ABSTRACT

A method and apparatus performing operations for paging monitoring control in a wireless device is provided. The operations include monitoring at least one paging identifier in a first radio resource control state a radio resource configuration is maintained for a user equipment. The operations further include transitioning from the first radio resource control state to a second radio resource control state, and monitoring at least two different paging identifiers in the second radio resource control state.

16 Claims, 5 Drawing Sheets

(56) References Cited

U.S. PATENT DOCUMENTS

| | | | |
|---|---|---|---|
| 2019/0082490 A1 | 3/2019 | Zhang et al. | |
| 2019/0289661 A1* | 9/2019 | Chen | H04W 74/0866 |
| 2021/0084616 A1 | 3/2021 | Vaidya et al. | |
| 2022/0141887 A1* | 5/2022 | Ahn | H04L 5/0091 |
| | | | 370/329 |
| 2023/0007623 A1* | 1/2023 | Da Silva | H04W 24/08 |
| 2024/0251383 A1* | 7/2024 | Murray | H04W 72/23 |

OTHER PUBLICATIONS

"3rd Generation Partnership Project; Technical Specification Group Radio Access Network; NR; NR and NG-RAN Overall Description; Stage 2 (Release 15)", 3GPP TS 38.300, V15.7.0, Sep. 2019, pp. 1-99.

"3rd Generation Partnership Project; Technical Specification Group Radio Access Network; NR; User Equipment (UE) procedures in Idle mode and RRC Inactive state (Release 15)", 3GPP TS 38.304, V15.5.0, Sep. 2019, pp. 1-29.

"3rd Generation Partnership Project; Technical Specification Group Radio Access Network; NR; Radio Resource Control (RRC) protocol specification (Release 15)", 3GPP TS 38.331, V15.7.0, Sep. 2019, pp. 1-527.

"3rd Generation Partnership Project; Technical Specification Group Services and System Aspects; Feasibility study on 5G message service for MIoT; Stage 1 (Release 16)", 3GPP TR 22.824, V16.0.0, Sep. 2018, pp. 1-27.

"3rd Generation Partnership Project; Technical Specification Group Services and System Aspects; System Architecture for the 5G System (5GS); Stage 2 (Release 16)", 3GPP TS 23.501, V16.2.0, Sep. 2019, pp. 1-391.

International Search Report and Written Opinion received for corresponding Patent Cooperation Treaty Application No. PCT/FI2021/050020, dated Apr. 19, 2021, 15 pages.

* cited by examiner

PAGING IN WIRELESS SYSTEMS

RELATED APPLICATION

This application was originally filed as PCT Application No. PCT/FI2021/050020, filed on Jan. 14, 2021, which claims priority from U.S. Provisional Application No. 62/975,883, filed on Feb. 13, 2020, and from U.S. Provisional Application No. 62/976,629, filed on Feb. 14, 2020, each of which is incorporated herein by reference in its entirety.

FIELD

Various example embodiments relate to paging in wireless systems.

BACKGROUND

Various measures have been developed for saving power for wireless devices. Allowing wireless devices to enter a low-power state when they are not transmitting or receiving data has always been an important part of achieving a balance between adequate communication performance and acceptable battery consumption. Improved connection, state and mobility handling are key elements of efficient support for current and future generation use cases with a growing number, as well as new types such as devices for machine-type communications (MTC), of wireless devices. Design of wireless device state machine is one of the central questions related to the overall control plane design. Two states, connected state for data transmission and power-saving/idle state, have been long used as radio resource control (RRC) states. With introduction of a third state, inactive state, improved latency and reduced network signalling may be achieved. In response to a paging message from the network, faster connection resume and start of data transfer can thus be achieved for a wireless device in inactive state.

SUMMARY

According to some aspects, there is provided the subject-matter of the independent claims. Some embodiments for some or all of the aspects are defined in the dependent claims.

According to a first aspect, there is provided a method, comprising: monitoring at least one paging identifier in a first radio resource control state, in which first radio resource control state a radio resource configuration for the user equipment is maintained; transitioning from the first radio resource control state to a second radio resource control state; and monitoring at least two different paging identifiers in the second radio resource control state.

According to a second aspect, there is provided an apparatus, comprising at least one processor, at least one memory including computer program code, the at least one memory and the computer program code being configured to, with the at least one processor, cause the apparatus at least to perform the method of the first aspect or an embodiment thereof.

According to a third aspect, there is provided an apparatus, comprising means configured for performing the method of the first aspect or the second aspect, or an embodiment thereof. The apparatus of any of the aspects may be a user equipment or for/comprised by a user equipment device.

According to a fourth aspect, there is provided a computer program product, a computer readable medium, or a non-transitory computer readable medium comprising program instructions for causing an apparatus to perform the method according to any one of the above aspects or embodiments thereof.

According to an example embodiment of any of the aspects, the transitioning from the first RRC state to the second RRC state is initiated autonomously without a trigger from the radio access network. For example, the transitioning may be triggered in response to detecting out of coverage for the user equipment or in response to initiating a power saving state or measure in the user equipment.

DETAILED DESCRIPTION

Figure 1:
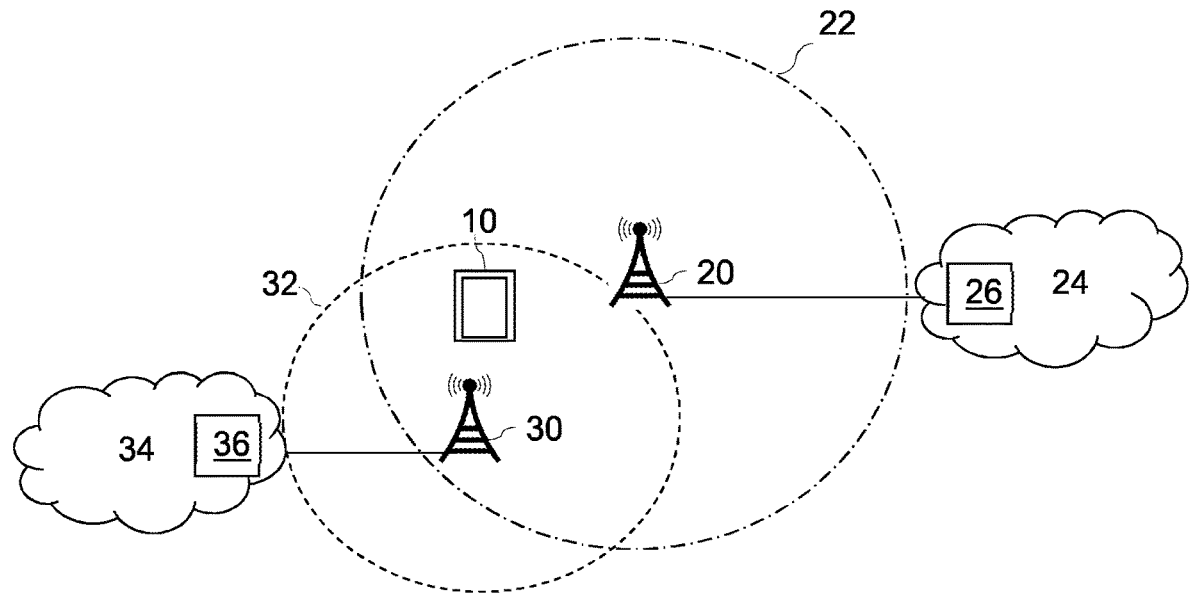
FIG. 1 illustrates a network scenario in accordance with at least some embodiments.

FIG. 1 illustrates a simplified example system. A user equipment (UE) 10 communicates wirelessly with a wireless radio or access network node, hereafter referred to as AN, 20, such as a NodeB, an evolved NodeB (eNB), a Next Generation (NG) NodeB (gNB), a base station, an access point, or other suitable wireless/radio access network device or system.

The UE 10 may be attached to a cell or coverage area 22, 32 of the AN, 20, 30 for wireless communications. The air interface between UE and AN may be configured in accordance with a Radio Access Technology, RAT, which both the UE 10 and AN 20, 30 are configured to support.

Examples of cellular RATs include Long Term Evolution, LTE, New Radio, NR, which is also known as fifth generation, 5G, and MulteFire. On the other hand, examples of non-cellular RATs include Wireless Local Area Network, WLAN, and Worldwide Interoperability for Microwave Access, WiMAX. Principles of the present disclosure are not limited to a specific RAT though. For example, in the context of LTE, AN 20, 30 may be a nodeB or evolved Node B (eNB), while in the context of NR, AN 20, 30 may be a gNB.

The AN 20, 30 may be connected, directly or via at least one intermediate node, with one or more devices or elements 26, 36 of a core network 24, 34, such as a Next Generation core network, Evolved Packet Core (EPC), or other network management element. The core network 24, 34 may comprise a set of network functions. A network function may refer to an operational and/or physical entity. For example, the element 26 may be a network function or be configured to perform one or more network functions. The network function may be a specific network node or element, or a specific function or set of functions carried out by one or more entities, such as virtual network elements. Examples of such network functions include an access control or management function, mobility management or control function, session management or control function, interworking, data management or storage function, authentication function or a combination of one or more of these functions.

For example, a 3GPP 5G core network comprises Access and Mobility Management Function (AMF) which may be configured to terminate RAN control plane (N2) interface and perform registration management, connection management, reachability management, mobility management, access authentication, access authorization, Security Anchor Functionality (SEAF), Security Context Management (SCM), and support for interface for non-3GPP access. The AMF is in charge i.a. for managing handovers between gNBs and initiating core-network paging by a paging message to a gNB.

The core network 24, 34 may be, in turn, coupled with another network (not shown), via which connectivity to further networks may be obtained, for example via a worldwide interconnection network. The AN may be connected with at least one other AN as well via an inter-base station interface, particularly for supporting mobility of the UE 10, e.g. by 3GPP X2 or similar NG interface.

The UE 10 may be referred to as a user device or wireless terminal in general. Hence, without limiting to Third Generation Partnership Project (3GPP) User Equipment, the term user equipment is to be understood broadly to cover various mobile/wireless terminal devices, mobile stations and user devices for user communication and/or machine to machine type communication. The UE 10 may be or be comprised by, for example, a smartphone, a cellular phone, a Machine-to-Machine, M2M, node, machine-type communications node, an Internet of Things, IoT, node, a car telemetry unit, a laptop computer, a tablet computer or, indeed, another kind of suitable user device or mobile station, i.e., a terminal.

Additionally, although the apparatuses have been depicted as single entities, different units, processors and/or memory units (not all shown in FIG. 1) may be implemented inside these apparatuses, to enable the functioning thereof. The system may also be able to support the usage of cloud services, for example at least part of core network operations may be carried out as a cloud service. The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. One of the concepts for 5G networks is network slicing in which multiple independent and dedicated virtual sub-networks (network instances) may be created within the same infrastructure to run services that have different requirements on latency, reliability, throughput and mobility.

It is obvious for a person skilled in the art that the depicted system is only an example of a part of a system and in practice, the system may comprise further access nodes, the user device may have an access to a plurality of radio cells and the system may comprise also other apparatuses, such as physical layer relay nodes or other core network functions or elements, etc. A cellular radio system may be implemented as a multilayer network including several kinds of cells, such as macrocells, microcells and picocells, for example. Typically, in multilayer networks, one access node provides one kind of a cell or cells, and thus a plurality of NodeBs are required to provide such a network structure. 5G may also utilize satellite communication to enhance or complement the coverage of 5G service, for example by providing backhauling.

Figure 4:
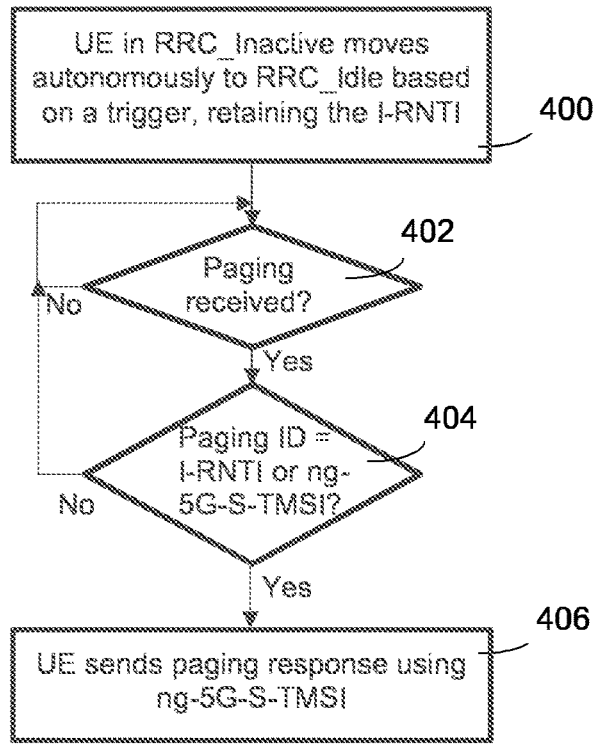
FIGS. 4 and 5 are flow charts illustrating user equipment operations in accordance with some embodiments.

With reference to radio resource control (RRC) states of 5G NR illustrated in FIG. 4, a new independent RRC state, referred to as RRC_INACTIVE, is introduced in 3GPP NR Rel-15 complementing the existing states, RRC_CONNECTED and RRC_IDLE, with the goal of lean signalling and energy-efficient support of NR services. A UE is either in RRC_CONNECTED state or in RRC_INACTIVE state when an RRC connection has been established. If this is not the case, i.e. no RRC connection is established, the UE is in RRC_IDLE state. The RRC_INACTIVE state enables to quickly resume the RRC connection and start the transmission of small or sporadic data with a much lower initial access delay and associated signalling overhead as compared to the RRC_IDLE state. As UE context is still stored in the gNB in the RRC_INACTIVE state, and when the UE resumes from RRC_INACTIVE to RRC_CONNECTED, the core network does not need to be contacted by the gNB to retrieve information about the UE to establish a new UE context.

As compared to keeping the UE 10 in RRC_CONNECTED state, the new state reduces mobility signalling both to RAN (e.g. RRC measurement reporting, handover messages) and to the core network (e.g. to/from the AMF) since connection management (CM) state of the UE is still CM-CONNECTED (instead of CM-IDLE in RRC_IDLE state).

In Rel-15, the transition from RRC_INACTIVE to RRC_IDLE is controlled by the network and requires a pair of RRC messages by the UE and network. Typically, it requires that the UE is first moved to RRC_CONNECTED and only afterwards it will be moved to RRC_IDLE (i.e. RRC transition from Inactive to Idle via Connected state). The network may alternatively transmit an RRC release message (to move the UE directly to RRC_IDLE).

However, in some situations the UE 10 may move from RRC_INACTIVE to RRC_IDLE autonomously. In this case, since there is a state mismatch between the UE and the network for some time, a paging failure may occur. There are now provided improvements facilitating to avoid paging failures encountered when the UE autonomously moves from a first RRC state to a second RRC state.

Figure 2:
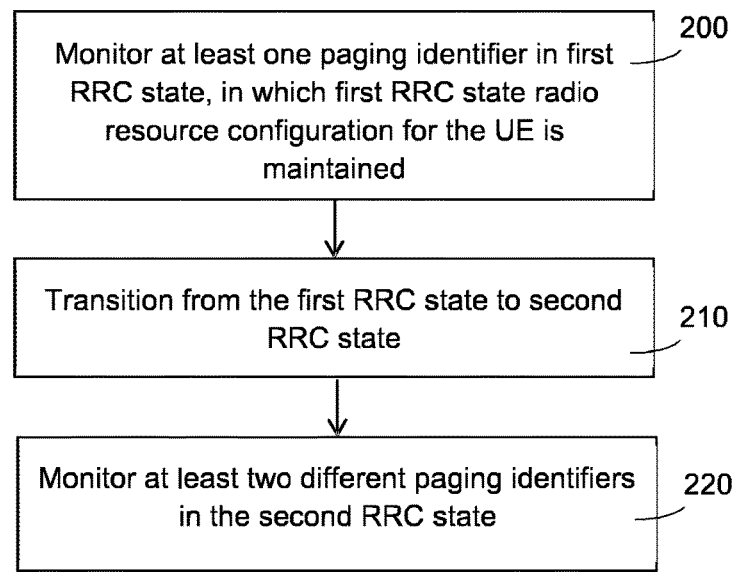
FIG. 2 illustrates a method in accordance with at least some embodiments.

FIG. 2 is a flow graph of a method for paging monitoring control in a wireless device or a user equipment/device in accordance with at least some embodiments. The method may be performed by a user equipment, such as the UE 10 also referred to as in the further example embodiments, or by a control device configured to control the functioning thereof, possibly when installed therein. It is to be noted that an action, such as transmitting, in a given block may refer to controlling or causing such action in another apparatus or unit.

Block 200 comprises monitoring at least one paging identifier in a first RRC state, in which first RRC state a radio resource configuration is maintained for the UE. Block 210 comprises transitioning from the first RRC state to a second RRC state. Block 220 comprises monitoring at least two different paging identifiers in the second RRC state.

The UE may thus in block 220 perform dual-monitoring of paging identifiers, both for the first RRC state and the second RRC state (referred below also as the first state and second state). The transition 210 from the first state to the second state may be initiated autonomously by the UE without a trigger from an RAN associated with the UE and the configuration. Such trigger may refer to signalling from the RAN to the UE. For example, the transition to non-RAN-connected second state may be triggered in response to detecting out of coverage for the user equipment or in response to initiating a power saving state or measure in the user equipment. Hence, network control is not required for all such state transition situations, but the UE may be allowed to instantiate such transition without network instruction or notification to the network.

The UE 10 may be configured to perform such dual-monitoring 220 after the transition without further trigger, and changes are not required in the operation in the first state. The UE may in block 220 monitor a (first) paging identifier assigned during the first state and a (second) paging identifier associated with the second state. The UE may initiate a paging response in response to detecting the first paging identifier, enabling to avoid the paging failure when the RAN is not yet aware of the new state of the UE. References are made below to the RAN; it will be appreciated that this may refer to operations of an access node, such as the AN 20, 30, which may be a gNB in 3GPP 5G networks, for example.

The first state may be a state in which RRC connection has been established. The second state may be a state in which there is no established RRC connection. The RRC connection may be released in response of the transition 210. For example, the first state may be an RRC inactive state, such as the 3GPP RRC_INACTIVE state, and/or the second state may be an RRC idle state, such as the 3GPP RRC_IDLE state.

The radio resource configuration may refer to configuration information stored for radio resource access to an associated RAN. The radio resource configuration may be stored by the UE and the RAN during the first state. The maintenance of the radio resource configuration may be discontinued by the apparatus in response of the transition 210, e.g. after the UE 10 transitions to the RRC_IDLE. Thus, the radio resource configuration stored during the first state may be removed in response to transitioning 210 to the second state. The radio resource configuration may be an RRC context, such as a UE (access stratum) context maintained by a last serving gNB. Paging of the UE may be initiated by the RAN when the UE is in the first state, but by core network when in the second state. When the UE is in the first state, the RAN may be aware of an area which the UE belongs to, such as the radio access network based notification area (RNA) of the UE, but in the second state the RAN does not have this information. A RAN-CN connection may be configured for UE during the first state (but not in the second state).

There may be a third state, which may be an active mode or a connected state, such as the RRC_CONNECTED state. It is noted that instead of the term 'state', the term 'mode' may be used. The states are not limited to currently applied or known (RRC) states or modes, such as the 5G RRC states of FIG. 3. Idle, inactive and connected states may generally refer to three modes, where the inactive mode is an intermediate mode between the idle mode, which is the least active among the three modes, and the connected mode which is the most active among the three modes. There can be nevertheless also other activity modes in the system. For example, the term idle mode may refer generally to a mode or state in which there are no radio resources reserved for active data transfer for the wireless device. The connected mode generally may refer to a mode or state in which radio resources are reserved for active data transfer for the wireless device. The inactive mode generally may refer to a mode or state in which more resources than in the idle mode but less than in the connected mode are reserved for active data transfer for the wireless device, but an RRC context or other UE information may be maintained in the network to facilitate faster mode change to the connected mode.

The paging identifiers monitored 220 in the second state may comprise the at least one paging identifier monitored 200 in the first radio resource control state. The UE may be configured to monitor in block 200 the same paging identifiers as monitored in block 220.

In some embodiments, the paging identifiers comprise a radio access network (level) paging identifier and a core network (level) paging identifier. The RAN-level paging identifier may be assigned during the first state and the CN-level paging identifier may be applied at least during the second state.

The paging identifiers may be monitored 220 in the second state for a specified time period. The time period is specified by a timer assigned for this purpose. The timer may be configurable. In some embodiments, the timer is configured by the RAN, such as the gNB, by RRC signalling.

After expiry of the time period, the UE 10 may continue the monitoring 220 for only one paging identifier in the second state. Thus, the UE may continue monitoring the (second) paging identifier associated with the second state, such as the ng-5G-S-TMSI for 3GPP 5G core network paging.

Figure 3:
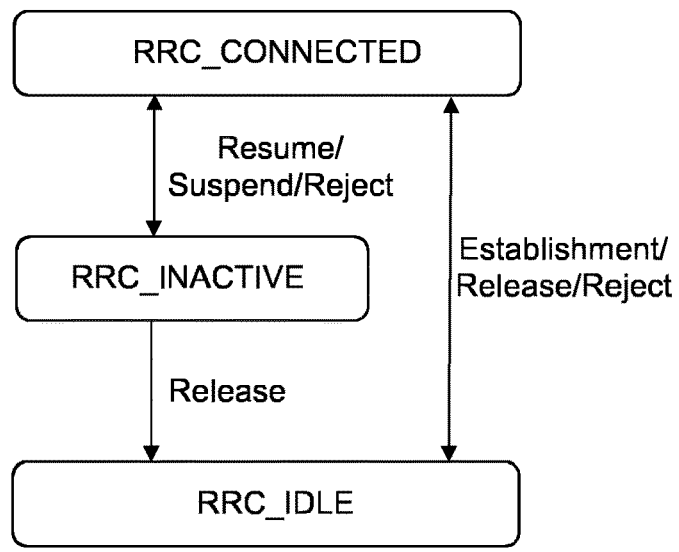
FIG. 3 illustrates radio resource control states.

In some embodiments, at least some of the presently disclosed features are applied for 5G NR systems, further such example embodiments being illustrated below. FIG. 3 illustrates 3GPP 5G RRC states for which the method may be applied. The UE 10 performing the method of FIG. 2 may be configured to perform an RRC state machine as illustrated in FIG. 3.

When the UE 10 is moved to RRC_INACTIVE via an RRC Connection Suspend message, UE Access Stratum (AS) context (may be referred to as UE Inactive AS Context), necessary for the quick resume of the RRC connection, is maintained both at the UE side and RAN side. At the resume (from RRC_INACTIVE to RRC_CONNECTED) the UE is identified by interactive radio network temporary identifier (I-RNTI). The UE (AS) context contains for instance bearer configuration parameters according to the latest RRC configuration and AS security context pointing to the integrity protection and ciphering algorithms and the AS keys. Based on the latter, the UE is capable to derive the (short) MAC-I, to be used as an authentication token, and is included in the request message the UE in the RRC_INACTIVE state sends to the network when it needs to send signalling or data, or in response to a paging message.

When in RRC_INACTIVE, the UE 10 remains in CM-CONNECTED state and can move within an area configured by RAN without notifying RAN (i.e. within RNA) and using a unique identifier: the Inactive-RNTI (I-RNTI). The RNA can cover a single or multiple cell(s) and is contained within the CN registration area. In RRC_INACTIVE, the last serving gNB node keeps the UE context and the UE-associated NG connection with the serving AMF and UPF. A RAN-based Notification Area Update (RNAU) procedure is run by the UE periodically and when the UE re-selects to a cell that does not belong to the configured RNA. If the UE accesses a gNB other than the last serving gNB, the receiving gNB triggers a procedure (XnAP Retrieve UE Context procedure) to get the UE context from the last serving gNB. The receiving gNB then becomes the serving gNB and it further triggers the NGAP Path Switch Request and applicable RRC procedures as illustrated in FIG. 2. After the path switch procedure, the serving gNB triggers the release of the UE context at the last serving gNB by means of the XnAP UE Context Release procedure.

While in RRC_INACTIVE or RRC_IDLE state, the UE is in a low power "sleep" mode to reduce battery consumption. It wakes up periodically based on a configured paging cycle value. Parameter ran-PagingCycle in SuspendConfig information element controls the paging cycle while the UE is in the RRC_INACTIVE state and the parameter defaultPagingCycle in the PCCH-Config information element controls the paging cycle while the mobile is in RRC_IDLE state. The paging cycle can be {320 ms, 640 ms, 1280 ms, 2560 ms} according to 3GPP 38.331. A typical value that is configured is 640 ms.

While in RRC_IDLE, the UE monitors the paging channels for CN-initiated paging, and in RRC_INACTIVE the UE 10 monitors paging channels also for RAN-initiated paging (3GPP specification 38.300). Thus, paging is initiated by NG-RAN (RAN paging via I-RNTI) or CN (CN-initiated paging via ng-5G-S-TMSI). In both cases, downlink control information (DCI) indicating the presence of the paging message may be scrambled with paging-RNTI (P-RNTI), whereas the paging message itself can include a UE identifier, the ng-5G-S-TMSI or I-RNTI. As already indicated, the UE may now be configured to monitor also RAN-level paging during the RRC_IDLE, some further embodiments being disclosed below.

After transitioning 210 from the first state to the second state, the UE 10 may receive a paging message addressed to a temporary radio network identifier assigned during the first state, such as the I-RNTI. The UE may transmit, in response to the paging message, a paging response message comprising a core network paging identifier, or another information element, to indicate the transition to the second state. Alternatively, the UE may transmit, in response to the paging message and in response to an access context, such as the 3GPP UE (AS) context, being available, a paging response message comprising the temporary radio network identifier. The UE may be configured to maintain radio resource configuration, such as the access context, when transitioning 210 from the first state to the second state. The storage of the context may be conditioned on the timer applied for block 220.

FIG. 4 illustrates 5G UE operations according to some embodiments. The UE moves in block 400 from RRC_INACTIVE to RRC_IDLE based on a trigger, such as power entering saving mode or detecting out of coverage cause.

Upon receiving 402 a paging message, the UE checks 404 if I_RNTI or ng-5G-S-TMSI is included as paging ID. If yes, the UE may send 406 a paging response using the included ng-5G-S-TMSI. The UE may thus set the UE-identity of a RRCSetupRequest message to the ng-5G-S-TMSI value (also in case of I-RNTI is detected, at least in case an access context does not exist).

During block 220, the UE in the RRC_IDLE mode may be configured to react to received paging identifiers as follows:
  Trigger connection setup in response to receiving ng-5G-S-TMSI.
  In response to receiving I-RNTI, trigger connection resume if UE (AS) context is retained (otherwise connection setup is triggered). Monitoring of these IDs may be configured to occur only for a network-defined period after moving to the RRC_IDLE from the RRC_INACTIVE.

Figure 5:
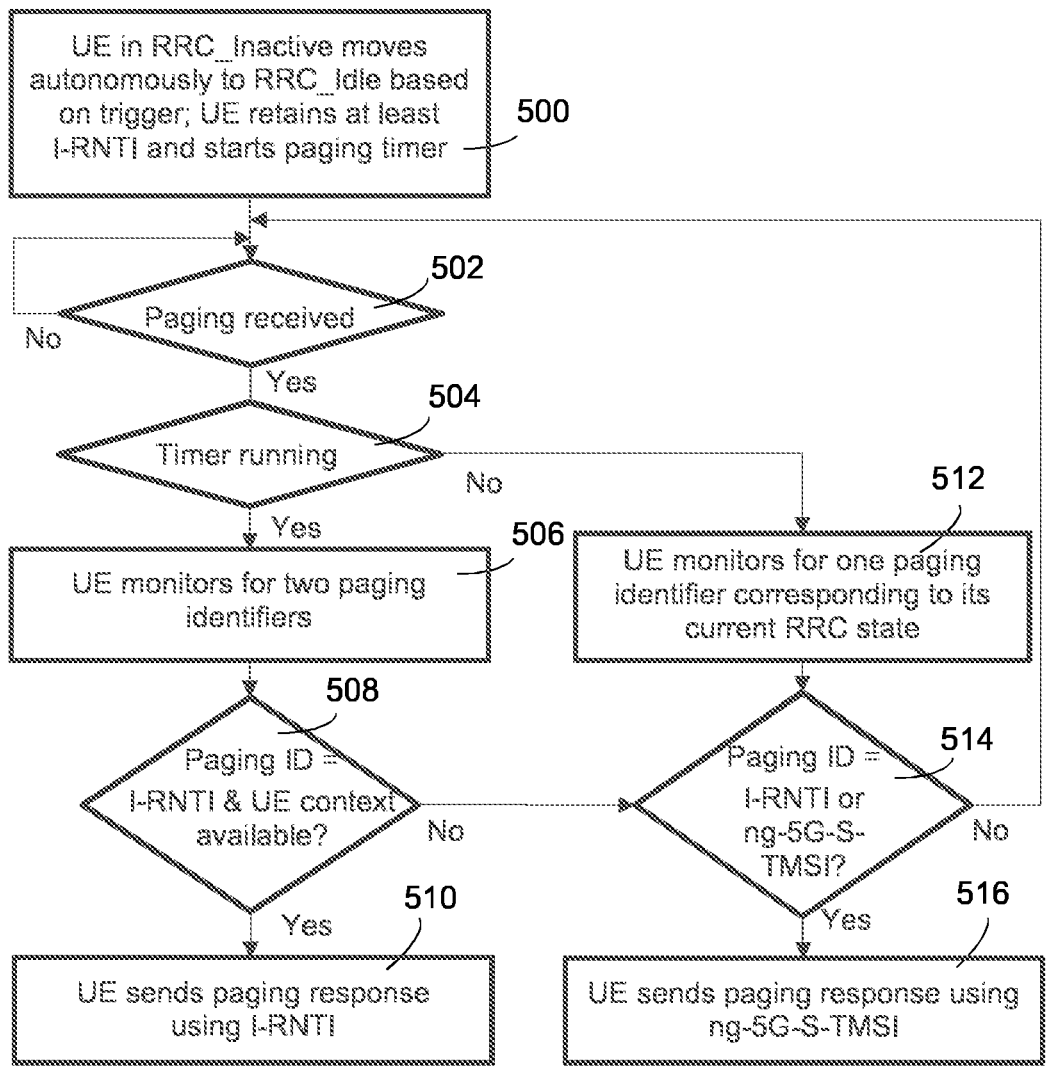

The latter case is also illustrated in FIG. 5 in blocks 508 and 510, whereby the response 510 is sent using the I-RNTI if the I-RNTI was detected as paging ID and if UE context is available at the UE. If the UE context is not available, response is sent 516 using the ng-5G-S-TMSI. (Blocks 514 and 516 illustrate that paging response is sent by using the ng-5G-S-TMSI if an I-RNTI or ng-5G-S-TMSI has been received.)

Application of a new timer is also illustrated for the multiple paging identifiers monitoring (220), referred herein as the "double paging ID" timer. This timer may be used to define the time during which the paging should be sent by the network and monitored by the UE using double paging identifiers. The UE starts the timer in connection with the state transition in block 500. Upon receiving 502 a paging message, if the timer is running at check 504, the UE monitors 506 for two paging identifiers, in the present example the I_RNTI and the ng-5G-S-TMSI. If the timer has expired, the UE monitors 512 for single paging identifier corresponding to its current RRC state, in the present example the RRC_IDLE. After the expiry of the timer, the UE thus returns to monitor 512 only one identifier corresponding to its current RRC state, which will be known to the network at this point in time, because the network will know whether the RNA update was sent (UE in RRC_INACTIVE) or not (UE in RRC_IDLE).

In some embodiments, after transitioning 210 to the second state, the UE monitors also RAN-level identifier on certain RNA. The UE may in block 220 monitor RAN-level identifier on RNA which was configured together with RAN identifier in an RRC Release message.

The UE, after moving from RRC_INACTIVE to RRC_IDLE autonomously, does not discard the RAN paging identifier, such as the I-RNTI, but is instead configured to retain it for a specified time period. The UE may be configured, after transitioning 210 to the RRC_IDLE, to perform one or more of:
  Discard the I-RNTI when the UE moves out of the RNA.
  Retain the I-RNTI and monitor it on certain RNA.
  Discard the I-RNTI when the UE transmits a tracking area update (TAU).
  Discard the I-RNTI if it has been subject to CN paging using the ng-5G-S-TMSI.

In some embodiments, which may be applied together with or separate from the method of FIG. 2, two (or even more) paging identifiers are transmitted from the RAN (AN 20) to the UE 10 during the first state and/or the second state. These paging identifiers may be included in a single paging message. The UE thus monitors the paging identifiers while in the first state and/or in the second state (220).

In an example embodiment, the RAN, such as the gNB may be configured to perform RAN level paging of the UE in RRC_INACTIVE using two paging identifiers in a paging message during a specified time period. This enables to reach the UE that the network assumes is in RRC_INACTIVE but also knows may have moved to RRC_IDLE. The period may account for or be set by the timer for periodic RNA updates (i.e. timer t380). This is advantageous since the lack of RNA update from the UE is indicative that the UE moved to RRC_IDLE. After the expiry of the timer, or upon another configured trigger (e.g. reception of a TAU or RRCSetupRequest), the RAN assumes the UE moved to RRC_IDLE and returns to send paging messages including only one identifier corresponding to the RRC_IDLE state.

The UE in the RRC_INACTIVE may be configured to react to received paging identifiers as follows:
  Trigger connection resume in response to receiving/detecting only the I_RNTI.

Trigger transition to RRC_IDLE in response to receiving only the ng-5G-S-TMSI.

In response to receiving both I-RNTI and ng-5G-S-TMSI, trigger connection resume (i.e. the UE ignores the ng-5G-S-TMSI).

The UE in the RRC_IDLE mode may be configured to react to received paging identifiers as follows:

Trigger connection setup in response to receiving ng-5G-S-TMSI.

In response to receiving both I-RNTI and ng-5G-S-TMSI, trigger connection resume if UE AS context is retained (otherwise connection setup is triggered). Monitoring of these IDs may be configured to occur only for a network-defined period after moving to the RRC_IDLE from the RRC_INACTIVE.

In some embodiments, the RAN, such as the gNB, may be arranged to configure the UE to monitor both RAN and CN paging identifier when in the second state, such as the RRC_IDLE. For example, RRC Release or System Information messages can be used for configuration.

Figure 6:
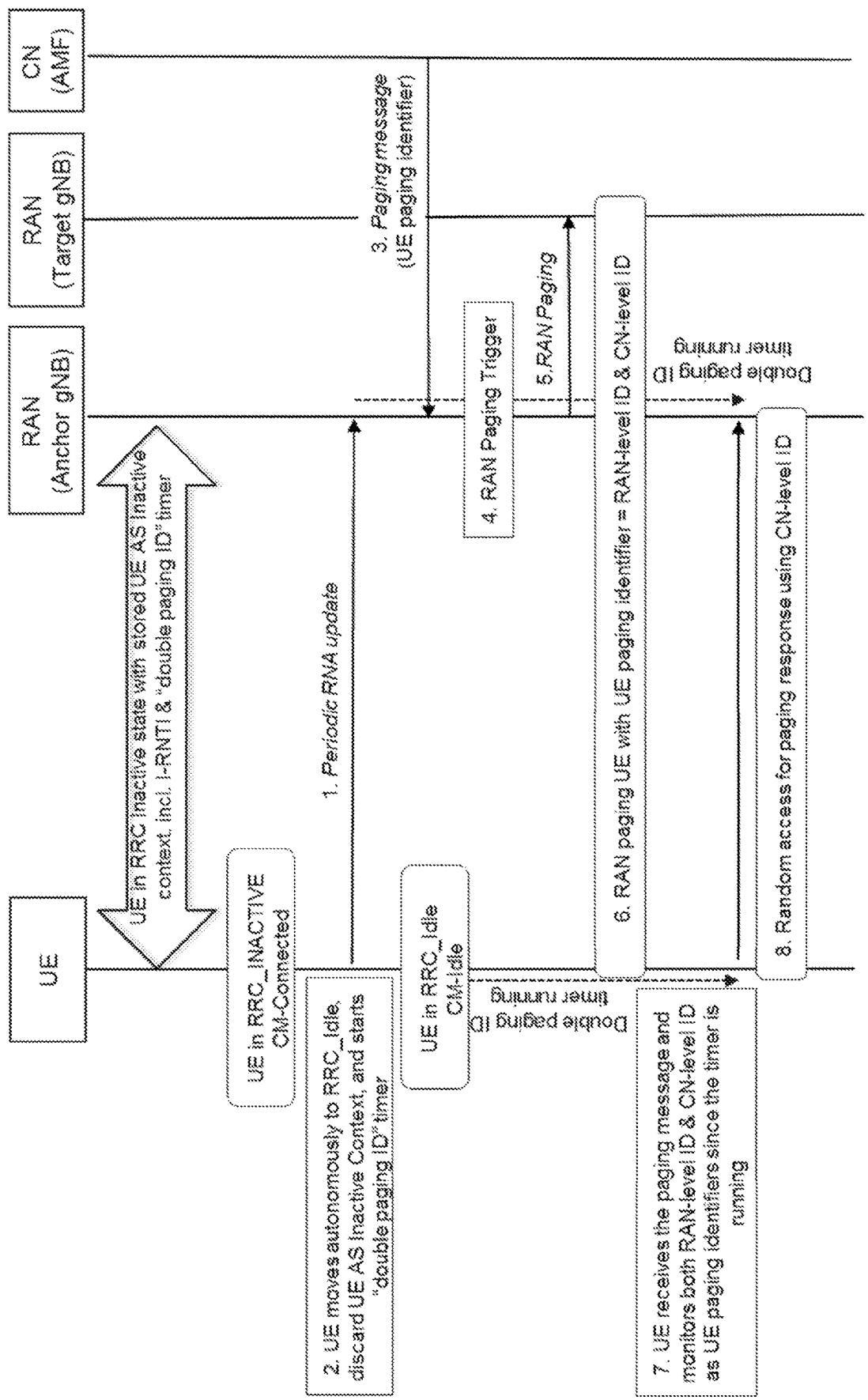
FIG. 6 is a signalling example in accordance with some embodiments.

FIG. 6 illustrates a signaling example for a 3GPP 5G NR system. The UE is first set RRC_INACTIVE state with stored UE (AS) Inactive context, including resume ID (I-RNTI) and the new timer, "double paging ID" timer.

In an example embodiment, the RAN also maintains such timer and sets this timer according to the periodic RNA time, such that it starts the "double paging timer" at the last RNA update. Thus, the timer will expire if a subsequent RNA update is not sent by the UE within the periodic RNA time window. The lack of an RNA update is indicative that the UE moved to RRC_IDLE, therefore the RAN can move to use a single paging ID, i.e. the CN/idle mode paging ID.

When the UE is in the RRC_INACTIVE state (and CM-Connected state), it will transmit a periodic RNA update (step 1.) to the RAN (the anchor gNB in the present example). In step 2, the UE moves autonomously to RRC_IDLE state, whereby it may discard the UE (AS) Inactive Context and start the "double paging ID" timer. The RAN may also start the timer upon receiving the RNA update.

In step 3, a paging message is received from core network (AMF) to the (anchor) RAN (Anchor gNB). This triggers (4.) RAN paging (5.) to the serving RAN (target gNB). The serving RAN initiates paging (6.) to the UE. The target gNB may be configured to include in the paging message both a RAN-level paging ID, such as the I-RNTI, and a CN-level paging ID, such as the ng-5G-S-TMSI. The UE receives the paging message and monitors both RAN-level paging ID and CN-level paging ID since the "double paging ID" timer is still running (7.). In the disclosed example, random access for paging response using the CN-level paging ID is performed (8.).

An electronic device comprising electronic circuitries may be an apparatus for realizing at least some embodiments of the present invention. The apparatus may be or may be comprised in a computer, a laptop, a tablet computer, a cellular phone, a machine to machine (M2M) device (e.g. an IoT sensor device), a wearable device, a base station, access point device, a network function element or node, or any other apparatus provided with radio communication capability. In another embodiment, the apparatus carrying out the above-described functionalities is comprised in such a device, e.g. the apparatus may comprise a circuitry, such as a chip, a chipset, a microcontroller, or a combination of such circuitries in any one of the above-described devices.

Figure 7:
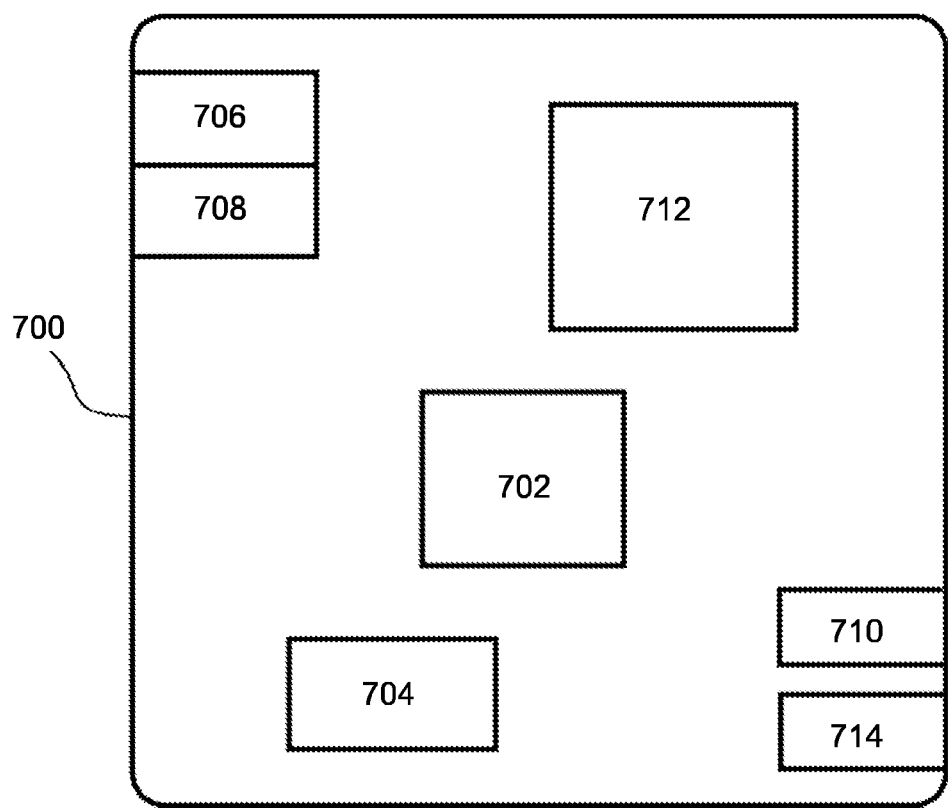
FIG. 7 illustrates an example apparatus capable of supporting at least some embodiments.

FIG. 7 illustrates an example apparatus capable of supporting at least some embodiments of the present invention. Illustrated is a device 700, which may comprise a communications device arranged to operate as the UE 10, for example. The device may include one or more controllers configured to carry out operations in accordance with at least some of the embodiments illustrated above, such as some or more of the features illustrated above in connection with FIGS. 2 to 6. The device may be configured to operate as the apparatus configured to perform the method of FIG. 2, or embodiments thereof, for example.

Comprised in the device 700 is a processor 702, which may comprise, for example, a single- or multi-core processor wherein a single-core processor comprises one processing core and a multi-core processor comprises more than one processing core. The processor 702 may comprise more than one processor. The processor may comprise at least one application-specific integrated circuit, ASIC. The processor may comprise at least one field-programmable gate array, FPGA. The processor may be means for performing method steps in the device. The processor may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The device 700 may comprise memory 704. The memory may comprise random-access memory and/or permanent memory. The memory may comprise at least one RAM chip. The memory may comprise solid-state, magnetic, optical and/or holographic memory, for example. The memory may be at least in part accessible to the processor 702. The memory may be at least in part comprised in the processor 702. The memory 704 may be means for storing information. The memory may comprise computer instructions that the processor is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The memory may be at least in part comprised in the processor. The memory may be at least in part external to the device 700 but accessible to the device. For example, control parameters affecting controlling operations illustrated in connection with FIG. 2 may be stored in one or more portions of the memory and used to control operation of the apparatus. Further, the memory may comprise other control parameters and device-specific cryptographic information.

The device 700 may comprise a transmitter 706. The device may comprise a receiver 708. The transmitter and the receiver may be configured to transmit and receive, respectively, information in accordance with at least one wired or wireless, cellular or non-cellular standard. The transmitter may comprise more than one transmitter. The receiver may comprise more than one receiver. The transmitter and/or receiver may be configured to operate in accordance with global system for mobile communication, GSM, wideband code division multiple access, WCDMA, long term evolution, LTE, 5G or other cellular communications systems, WLAN, and/or Ethernet standards, for example. The device 700 may comprise a near-field communication, NFC, transceiver 710. The NFC transceiver may support at least one NFC technology, such as NFC, Bluetooth, Wibree or similar technologies.

The device 700 may comprise user interface, UI, 712. The UI may comprise at least one of a display, a keyboard, a touchscreen, a vibrator arranged to signal to a user by causing the device to vibrate, a speaker and a microphone. A user may be able to operate the device via the UI, for example to accept incoming telephone calls, to originate telephone calls or video calls, to browse the Internet, to manage digital files stored in the memory 704 or on a cloud accessible via the transmitter 706 and the receiver 708, or via the NFC transceiver 710, and/or to play games.

The device 700 may comprise or be arranged to accept a user identity module or other type of memory module 714. The user identity module may comprise, for example, a subscriber identity module, SIM, and/or a personal identification IC card installable in the device 700. The user identity module 714 may comprise information identifying a subscription of a user of device 700. The user identity module 714 may comprise cryptographic information usable to verify the identity of a user of device 700 and/or to facilitate encryption and decryption of communication effected via the device 700.

The processor 702 may be furnished with a transmitter arranged to output information from the processor, via electrical leads internal to the device 700, to other devices comprised in the device. Such a transmitter may comprise a serial bus transmitter arranged to, for example, output information via at least one electrical lead to memory 704 for storage therein. Alternatively to a serial bus, the transmitter may comprise a parallel bus transmitter. Likewise the processor may comprise a receiver arranged to receive information in the processor, via electrical leads internal to the device 700, from other devices comprised in the device 700. Such a receiver may comprise a serial bus receiver arranged to, for example, receive information via at least one electrical lead from the receiver 708 for processing in the processor. Alternatively to a serial bus, the receiver may comprise a parallel bus receiver.

The device 700 may comprise further devices not illustrated in FIG. 7. For example, the device may comprise at least one digital camera. Some devices may comprise a back-facing camera and a front-facing camera. The device may comprise a fingerprint sensor arranged to authenticate, at least in part, a user of the device. In some embodiments, the device lacks at least one device described above. For example, some devices may lack the NFC transceiver 710 and/or the user identity module 714.

The processor 702, the memory 704, the transmitter 706, the receiver 708, the NFC transceiver 710, the UI 712 and/or the user identity module 714 may be interconnected by electrical leads internal to the device 700 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

References throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or functional features may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof.

Furthermore, the described features, structures, or characteristics may be combined in any suitable manner in one or more embodiments. In the preceding description, numerous specific details are provided to provide a thorough understanding of some embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

What is claimed is:

1. An apparatus for a user equipment, comprising at least one processor, at least one memory including computer program code, the at least one memory and the computer program code being configured to, with the at least one processor, cause the apparatus at least to:

monitor at least one paging identifier in a first radio resource control state, in which first radio resource control state a radio resource configuration is maintained for the user equipment;
transition from the first radio resource control state to a second radio resource control state; and
monitor at least two different paging identifiers in the second radio resource control state for a time period specified by a timer configured by a radio access network.

2. The apparatus of claim 1, wherein the transitioning from the first radio resource control state to the second radio resource control state is initiated autonomously without a trigger from the radio access network.

3. The apparatus of claim 1, wherein a radio resource control connection is not established in the second radio resource control state.

4. The apparatus of claim 1, wherein the apparatus is caused to continue the monitoring for only one paging identifier in the second radio resource control state after expiry of the time period.

5. The apparatus of claim 1, wherein the first radio resource control state is radio resource control inactive state and/or wherein the second radio resource control state is radio resource control idle state.

6. The apparatus of claim 1, wherein the at least two paging identifiers monitored in the second radio resource control state comprise the at least one paging identifier monitored in the first radio resource control state.

7. The apparatus of claim 1, wherein the at least two paging identifiers monitored in the second radio resource control state comprise two paging identifiers also monitored in the first radio resource control state.

8. The apparatus of claim 1, wherein the at least two paging identifiers comprise a radio access network paging identifier and a core network paging identifier.

9. The apparatus of claim 1, wherein the apparatus is caused to monitor two paging identifiers, wherein the two paging identifiers are comprised in a single paging message.

10. The apparatus of claim 1, wherein the apparatus is further caused to:
receive, after transitioning from the first radio resource control state to the second radio resource control state, a paging message addressed to a temporary radio network identifier assigned during the first radio resource control state, and
transmit, in response to the paging message, a paging response message comprising a core network paging identifier or another information element to indicate the transition to the second radio resource control state, or
transmit, in response to the paging message and in response to an access context being available, a paging response message comprising the temporary radio network identifier.

11. The apparatus of claim 10, wherein the apparatus is further caused to maintain the access context when moving from the first radio resource control state to the second radio resource control state.

12. The apparatus of claim 1, wherein the apparatus is or is comprised by a cellular user equipment device.

13. A method for a user equipment, comprising:
monitoring at least one paging identifier in a first radio resource control state, in which first radio resource control state a radio resource configuration is maintained for the user equipment;
transitioning from the first radio resource control state to a second radio resource control state; and
monitoring at least two different paging identifiers in the second radio resource control state for a time period specified by a timer configured by a radio access network.

14. The method of claim 13, wherein the transitioning from the first radio resource control state to the second radio resource control state is initiated autonomously without a trigger from the radio access network.

15. The method of claim 13, wherein a radio resource control connection is not established in the second radio resource control state.

16. The method of claim 13, wherein only one paging identifier is monitored in the second radio resource control state after expiry of the time period.

* * * * *